United States Patent

Rabodzei et al.

[11] 3,846,632
[45] Nov. 5, 1974

[54] CLOSED-CIRCUIT TV INSPECTION X-RAY MICROSCOPE

[76] Inventors: Nikolai Vasilievich Rabodzei, Institutskays ulitsa, 6a, kv. 39; Evgeny Mikhailovich Ljubimov, ulitsa Lenina, 14, kv. 21; Mikhail Nikolaevich Nadobnikov, ulitsa Vokzalnaya, 21 kv. 7; Alexandr Alexandrovich Krokhin, ulitsa Isentralnaya 12, kv. 8, all of Fryazino Moskovskoi oblasti, U.S.S.R.

[22] Filed: July 9, 1973

[21] Appl. No.: 377,776

Related U.S. Application Data

[63] Continuation-in-part of Ser. Nos. 90,262, Nov. 17, 1970, abandoned, and Ser. No. 50,431, Sept. 4, 1970.

[52] U.S. Cl. .................................. 250/312, 250/360
[51] Int. Cl. ........................................... G03b 41/16
[58] Field of Search ........... 250/312, 321, 358, 359, 250/360, 361, 363, 369

[56] References Cited
UNITED STATES PATENTS
3,261,967   7/1966   Rosin ............................ 235/151.32

Primary Examiner—James W. Lawrence
Assistant Examiner—C. E. Church
Attorney, Agent, or Firm—Waters, Roditi, Schwartz & Nissen

[57] ABSTRACT

An X-ray inspection microscope having a closed-type TV circuit and designed for measuring angles between details of the inner structure of opaque specimens. The microscope comprises a specimen chamber in which the specimen being inspected is irradiated with an X-ray beam, and a transmitting TV camera mounted on the specimen chamber wall behind the specimen along the beam, and coaxial therewith. The TV camera can be rotated about and is movable along the longitudinal axis. An X-ray sensitive TV pick-up tube to convert the X-ray shadow image of the specimen into a TV video signal is mounted in the TV camera. Further, the microscope comprises a TV monitor electrically connected to the transmitting TV camera and having a screen to display an enlarged image of the inner structure of the specimen being irradiated.

4 Claims, 2 Drawing Figures

CLOSED-CIRCUIT TV INSPECTION X-RAY MICROSCOPE

The present application is a continuation-in-part of our co-pending applications No. 90,262, now abandoned, filed Nov. 17, 1970 and No. 50,431 filed Sept. 4, 1970.

The invention relates to inspection and measuring devices, and more particularly to TV inspection X-ray microscopes intended to measure the dimensions of parts and hidden flaws in specimens contained in opaque enclosures, for example, electronic devices.

Widely known in the art are TV inspection X-ray microscopes comprising an X-ray source, a shielded specimen chamber to house the specimen being inspected and an X-ray shadow image of the specimen into a TV video signal.

When conventional microscopes are used to measure the linear dimensions of details of the inner structure of opaque objects, the irradiated specimen is moved along coordinate axes so as to bring the outline of an enlarged image of the details of interest under the cross-hair sight viewed on the screen of a video control device, i.e., a TV monitor.

This does not permit a direct measurement of angles between the inner structure details of the specimen both lying in a plane normal to the X-ray beam axis and randomly oriented in space.

An earlier patent to Jallasch teaches an optical inspection microscope intended to measure angles between the outlines of the images of the specimen details lying in the focal plane of the microscope.

In this device, sighting and angle measurement are conducted by means of two cross-hairs on the microscope eyepiece, one rotating together with the eyepiece and the other rotating with the help of a ring provided on the eyepiece. The Jallasch microscope has a means for orienting the specimen before performing measurements. Application of the angle measurement principles of the Jallasch microscope to X-ray irradiation is ineffective for the following reasons:

1. Provision of a cross-hair sight, as taught by the Jallasch patent, at the output of the shadow-image-to-video-signal converter (by applying onto the kinescope target) does not produce the desired effect because of inherent errors due to parallax.

2. A cross-hair sight in the form of thin wires made of a material strongly adsorbing X-rays, when placed before the X-ray sensitive TV pick-up tube and moved similarly to the cross-hairs in the eyepiece of the Jallasch microscope would be ineffective because they would become invisible against the background of highly adsorptive details and present a weak contrast as compared to those transparent to X-rays.

3. X-ray television is characterized by such a great depth of focus (in the direction of viewing) that it is impossible to distinguish the outlines of details lying in the plane of measurement from those of details randomly oriented rleative to the plane of measurement. Since the Jallasch patent describes an optical device characterized by a low depth of focus the Jallasch method cannot be applied to X-ray technique. U.S. Pat. Ser. No. 3,261,967 (Rosin et al.) teaches an apparatus for measuring linear dimensions of optically observed objects by means of a transmitting TV camera rotatable around a fixed axis. The extent of displacement of the TV camera is indicated by a counter and recorder. The Rosin apparatus can also be adapted for measuring moving images with the aid of reading scales observed on the TV screen.

The TV camera rotates around an axis normal to the direction of sighting. The direction of viewing is not fixed in space and mutual fixation around one axis of the center of the cross-hairs sight, the center of rotation of the TV camera and the axis of viewing is absent. Because of this, the measurement results are affected by the distance from the object being viewed to the TV camera, which renders this method absolutely impossible to use for X-ray inspection. The Rosin apparatus does not permit angle measurements of three-dimensional objects with random space locations of details.

An object of the invention is to provide a TV inspection X-ray microscope provided with a means for direct measurement of angles between details of the inner structure of opaque objects.

Another object of the invention is to provide a TV inspection X-ray microscope having means for measuring angles between randomly space-oriented details of the inner structure of relatively large asymmetric objects.

According to the invention, In a TV inspection X-ray microscope, a transmitting TV camera with an X-ray sensitive TV pick-up tube is contained in a cylinder which serves as a radiation shield for the transmitting camera and is mounted in a specimen chamber, being movable together with the transmitting TV camera and the TV pick-up tube along and rotatable around the axis of the X-ray beam.

The axis of said cylinder coincides with the axis of the X-ray beam.

The axis of the X-ray beam, in this case, is an imaginary ray which emerges from a single point of the X-ray tube and which is normal to the X-ray sensitive converter constituted by a TV pick-up tube.

The main feature of this ray (the axis of the beam) is the absence of projection distortion in sighting the detail outlines on one of the mutually perpendicular planes intersecting on the beam axis with respect to the other plane. It follows that the imaginary traces of intersection of these planes with the target of the TV pick-up tube should coincide with the lines of the sighting cross-hair. The sighting cross-hairs appear on the target of the TV monitor in the form of two mutually perpendicular and intercrossing lines and are produced by admixing control pulses in the line synchronous pulses and frame synchronous pules into the TV video signal. The crossing point of the said lines corresponds to the point of incidence of the X-ray beam axis on the target of the TV pick-up tube.

It is preferred to provide TV inspection X-ray microscopes with an angle scale along the circumference of the cylinder shield and with a means for reading angles of rotation of said cylinder of the transmitting camera with the TV pick-up tube off said scale.

It is also desirable to provide a means for controlling the space orientation of the specimen and moving it in a plane normal to the X-ray beam on two mutually perpendicular coordinate axes.

Realization of a TV inspection X-ray microscope in accordance with the invention permits its use for measuring angles between details of the inner structure of opaque objects in a simple manner, namely by rotating a TV-camera with the X-ray sensitive TV pick-up tube, and not by rotating the specimen itself, which makes redundant any of the special angle-measuring devices which would be used if the specimen were rotated.

Displacement of the specimen chamber along the X-ray beam axis makes possible measurements of asymmetrical and relatively large objects even when changing the orientation of such specimens relative to the beam axis requires the provision of room for turning the specimen, that the transmitting camera be moved from and towards the object without loss of sharpness of the X-ray shadow image outline. Further, displacement of the transmitting camera along the X-ray beam axis permits varying the dose of X-ray radiation.

The invention will be further described with reference to the accompanying drawings.

Figure 1:
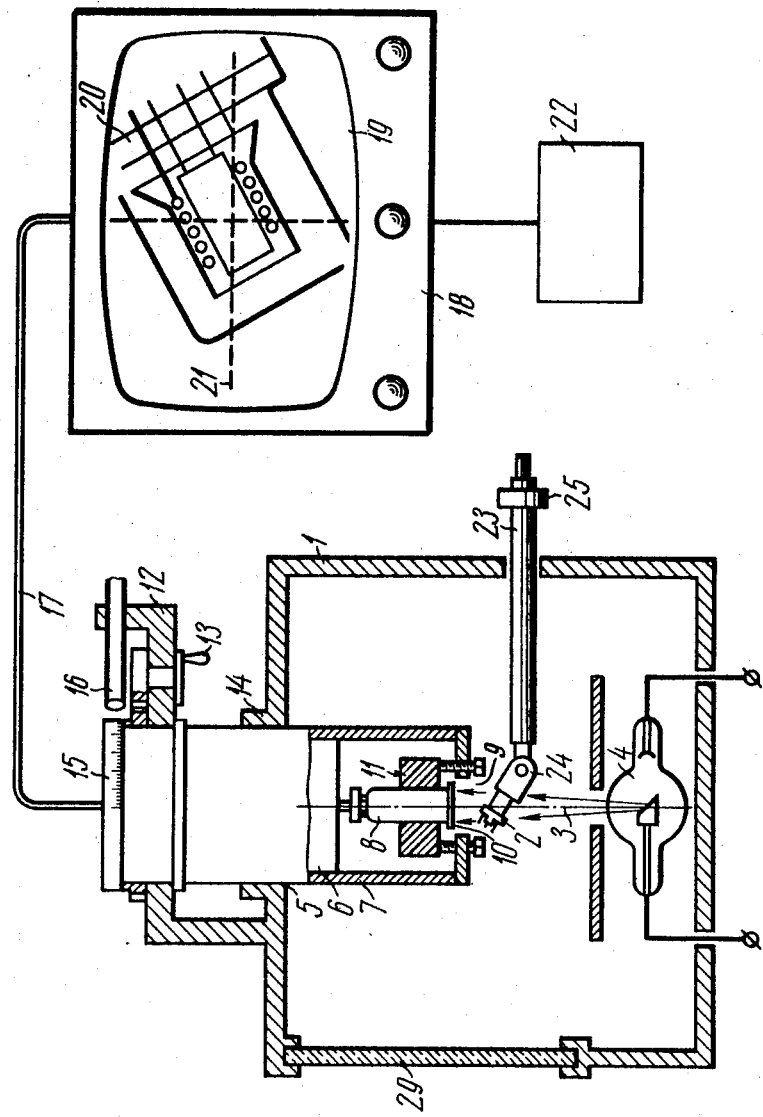
FIG. 1 is a schematic representation in side elevation and partly in section of a TV inspection X-ray microscope according to the invention.

Referring now to FIG. 1, the microscope comprises a shielded specimen chamber 1 where a specimen 2 is placed to be illuminated by a beam of X-rays having an imaginary axis 3 and emerging from an X-ray source 4 (an X-ray tube). Through an opening 5 in the wall of the chamber 1 opposite to the source of the X-ray beam, a TV transmitting camera 6 enclosed in a shielding cylinder 7 enters the specimen chamber 1.

The TV transmitting camera 6 comprises an X-ray sensitive TV pick-up tube 8, whose longitudinal axis coincides with that of the TV camera 6, and a preamplifier (not shown in the drawing).

The cylinder 7 has an opening 9 through which an X-ray shadow image 2 is projected onto a target 10 of the TV pick-up tube 8.

The TV inspection X-ray microscope is built so that the longitudinal axis of the TV pick-up tube 8 and that of the TV camera 6 coincide with the beam axis 3. With the aid of an adjusting mechanism 11, including a holder of the TV pick-up tube 8 and three screws positioned at an angle of 120° to one another, the TV pick-up tube 8 is oriented so that its target 10 is normal to the beam axis 3.

A plate 12 rigidly attached to the chamber 1 holds a turning mechanism 13 for turning the cylinder 7 in guides 14 of the opening 5 around the beam axis 3. The mechanism 13 is constituted by a cogwheel gear.

An angular scale 15 is provided on one end of the cylinder 7 opposite to the opening 9. The turning angles of the cylinder 7 are read with the aid of an optical means 16 fixed on the plate 12. The optical means 16 is constituted by a sighting microscope.

The TV camera 6 is connected by a cable 17 to a TV monitor 18 on a screen 19 of which an enlarged image 20 of the inner structure of the specimen 2 and an image of a cross-hair sight 21 are viewed. The cross-hairs 21 are produced by admixing suitable control pulses which synchronized with line and frame pulses of the TV signal with the help of electrical arrangement 22 consisting of a commonly known pulse generator, pulse delay unit and single line selecting oscillograph (not shown in the drawing).

Coincidence of the center of the cross-hairs 21 with the beam axis 3 is effected by simply adjusting the pulse delay unit, producing an image of the vertical and horizontal cross-hairs.

A manipulator 23 introduced into the chamber 1 through its wall serves to perform placement movements of the specimen 2 and orienting it relative to the beam axis 3. The specimen 2 is fastened in a socket 24 of the manipulator 23. With the help of handles 25 outside the chamber 1 turning and linear displacement of the specimen 2 on two mutually perpendicular coordinate axes in a plane normal to the beam axis 3 are effected.

Figure 2:
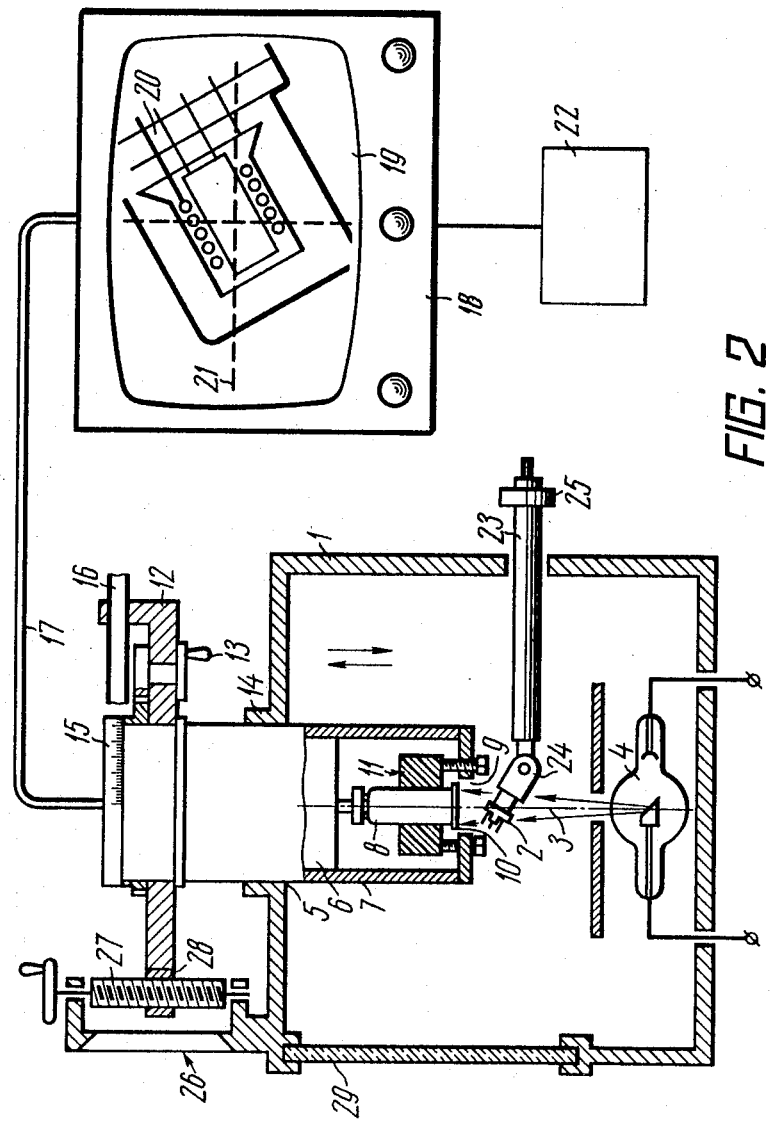
FIG. 2 is another embodiment of this invention.

Referring to FIG. 2, there is shown another embodiment of the invention.

It is well known that to ensure sharply outlined images of the details of the specimen inner structure, it is desirable that the specimen 2 should be in reasonable proximity to the target 10 of the TV pick-up tube 8. When changing orientation of an asymmetric specimen in order to bring the detail contours into positions convenient for angle measurements, the specimen may sometimes be stopped by the target 10 of the TV pick-up tube 8. To avoid this, operation displacements of the TV camera 6 include its movement along the beam axis 3. This is effected with the aid of means 26 comprising a screw 27 and a nut 28. The nut 28 is rigidly fixed in the plate 12 so that the latter is raised or lowered together with the cylinder 7 when the screw 27 is turned.

A window 29 is provided in the chamber 1 for visual observation of the specimen.

The procedure of measurement using the TV inspection X-ray microscope is as follows.

The first step is to position and orient the specimen 2 with the aid of the manipulator 23 so that enlarled images 20 of the details of the inner structure of the specimen 2 required for angle measurements are obtained on the screen 19. It should be noted that since X-ray projection is made in an X-ray beam diverging from a single point, the images of details arranged in succession in the path of the beam at different distances from the target 10 are distorted to a considerable and different degree, which distortion results in measurement errors. To avoid these errors, the contour of the detail being measured on the image 20 must intersect the center of the image of the sighting cross-hairs 21. To achieve this before performing measurements, the specimen 2 with the help of the manipulator 23 is displaced in a plane normal to the beam axis 3.

After the specimen 2 is properly oriented, the transmitting camera 6 with the X-ray sensitive TV pick-up tube 8 by means of the turning mechanism 13 is rotated around its longitudinal axis until the contour of the measured detail image is coincident with one of the sighting cross-hairs 21. The turning angles of the camera 6 are read off the angle scale 15 through the optical device 16. Then, the camera 6 is turned until the contour of the image of another detail is brought under the same line sighting cross-hair 21 on the screen 19 and the angle scale is read again. The sought angle is determined as the difference between the two readings.

When inspecting specimens of complex configuration, it may be necessary to move the specimen between the two readings, for only a part of the specimen can be viewed and sighted at a time. To meet this necessity, with the aid of the manipulator 23, selected portions of the specimen 2 are brought within the field of vision of the microscope and their contours are sighted. The specimen is moved only in a plane perpendicular to the beam axis 3 and sighting is carried out through the cross-hair sight 21 whose center is coincident with the beam axis 3.

When changing the orientation of the specimen 2 to bring the details being measured into position convenient for angle measurements, the TV camera 6 may impede free movement of the specimen 2 in the chamber 1. To avoid this, with the aid of the means 26 (see FIG. 2), the TV camera 6 with the TV pick-up tube 8 is moved away from the specimen 2 along the beam axis 3. After this, the details of the specimen 2 are measured as described for the arrangement of FIG. 1. The above-described TV inspection X-ray microscope, in accordance with the present invention, offers the following advantages:

1. rotation of the specimen, which is difficult to realize physically, is replaced by the simple, more accurate and convenient rotation of the X-ray sensitive TV pick-up tube;

2. it is possible to measure angles between inner structure details randomly oriented in space;

3. the specimen is free to be moved in a plane normal to the axis of the X-ray beam without upsetting the key condition for accurate angular measurements on a TV inspection X-ray microscope, which means that the center of rotation of the specimen (image) lies on the symmetry axis of the X-ray beam;

4. rotation of the TV camera may be used to obtain angles of orientation of the image which would be more convenient for viewing specimens, particularly in mass inspection of identically oriented specimens;

5. placing the TV camera in an individual envelope (the shielding cylinder), which may be withdrawn from the specimen chamber, frees a substantial volume of the specimen chamber for handling specimens of large dimensions due to the necessity of changing their orientation;

6. the dose of radiation incident on the specimen may be controlled by displacing the TV camera together with the TV pick-up tube along the X-ray beam axis thus varying the distance between the anode of the X-ray tube and the TV pick-up tube.

What we claim is:

1. A closed-circuit TV inspection X-ray microscope comprising: a shielded specimen chamber to hold a specimen; an X-ray source intended for irradiation of the specimen with an X-ray beam and producing a shadow X-ray image of the inner structure of said specimen, said X-ray source being positioned so that said X-ray beam emerging from it illuminates said specimen chamber; said specimen chamber having a wall with an opening behind said specimen in the path of said X-ray beam and coaxial herewith; a shielding cylinder introduced through said opening coaxially with said X-ray beam and rotatable around its longitudinal axis; a transmitting TV camera contained in said shielding cylinder, said shielding cylinder having an opening at an end thereof facing said X-ray source; an X-ray sensitive TV pick-up tube to convert the X-ray shadow image of the specimen into a TV video signal, said pick-up tube being mounted in the interior of said transmitting TV camera coaxially therewith and oriented so that its target, on which said X-ray shadow image is projected, is perpendicular to the axis of said X-ray beam entering through said opening in said shielding cylinder; a turning means for rotating said transmitting TV camera with the TV pick-up tube around the axis of the X-ray beam; a TV monitor electrically connected to said TV camera; said TV monitor having a screen for viewing an enlarged image of the inner structure of said specimen; and means for producing an image of a cross-hair sight on said screen and for aligning the center of said cross-hair sight with the axis of said beam.

2. A TV inspection X-ray microscope as claimed in claim 1 wherein said transmitting TV camera is movable along the axis of said beam, and a means for effecting movement of said transmitting camera.

3. A TV inspection X-ray microscope as claimed in claim 1 wherein an angle scale is provided along the circumference of said shielding cylinder, and an optical means to read off said scale the angles of rotation of said shielding cylinder with said transmitting camera.

4. A TV inspection X-ray microscope as claimed in claim 1 comprising means for controlling the space orientation of the specimen and displacing it along two mutually perpendicular coordinate axes in a plane normal to the axis of said X-ray beam.

* * * * *